Patented June 24, 1941

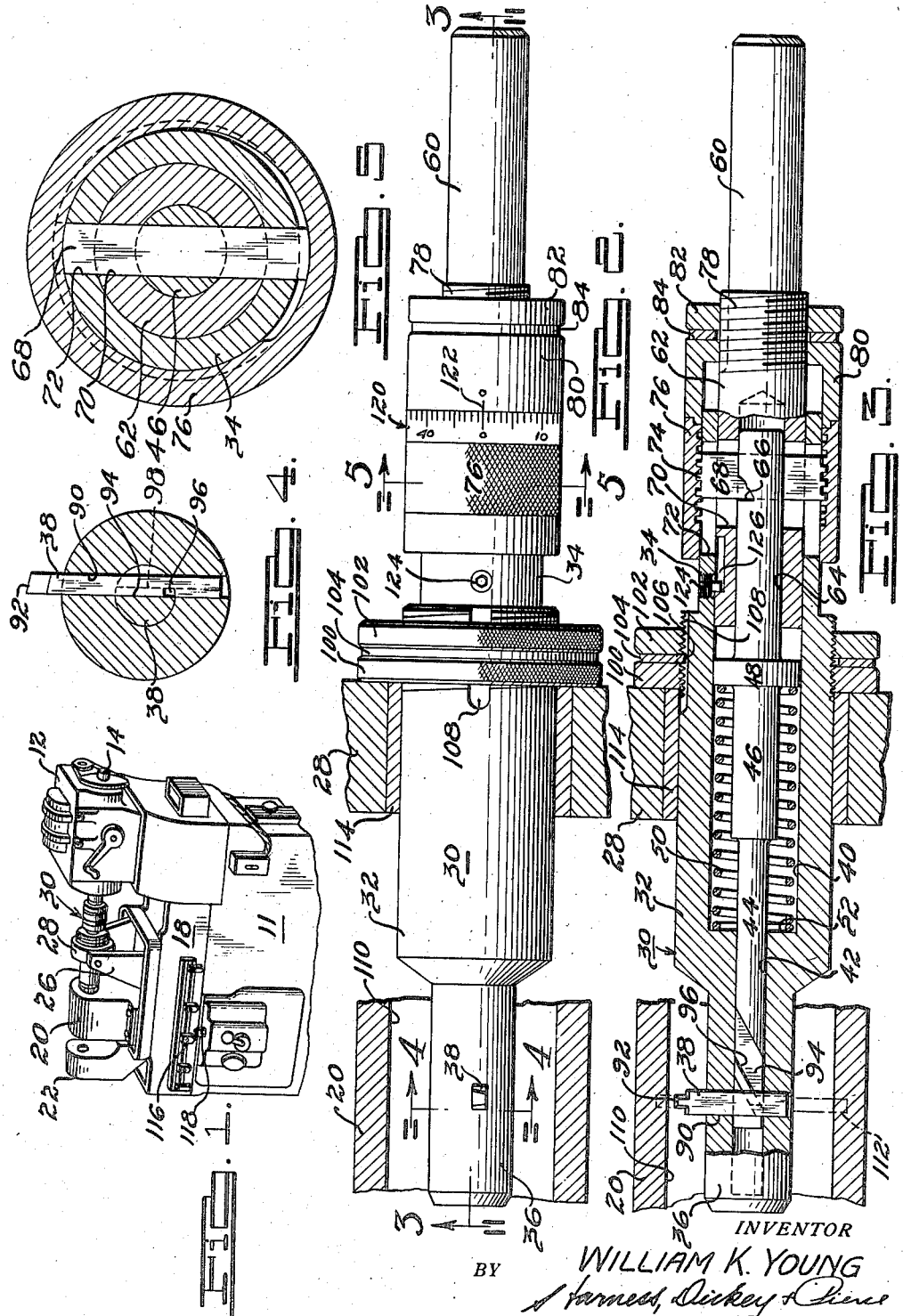

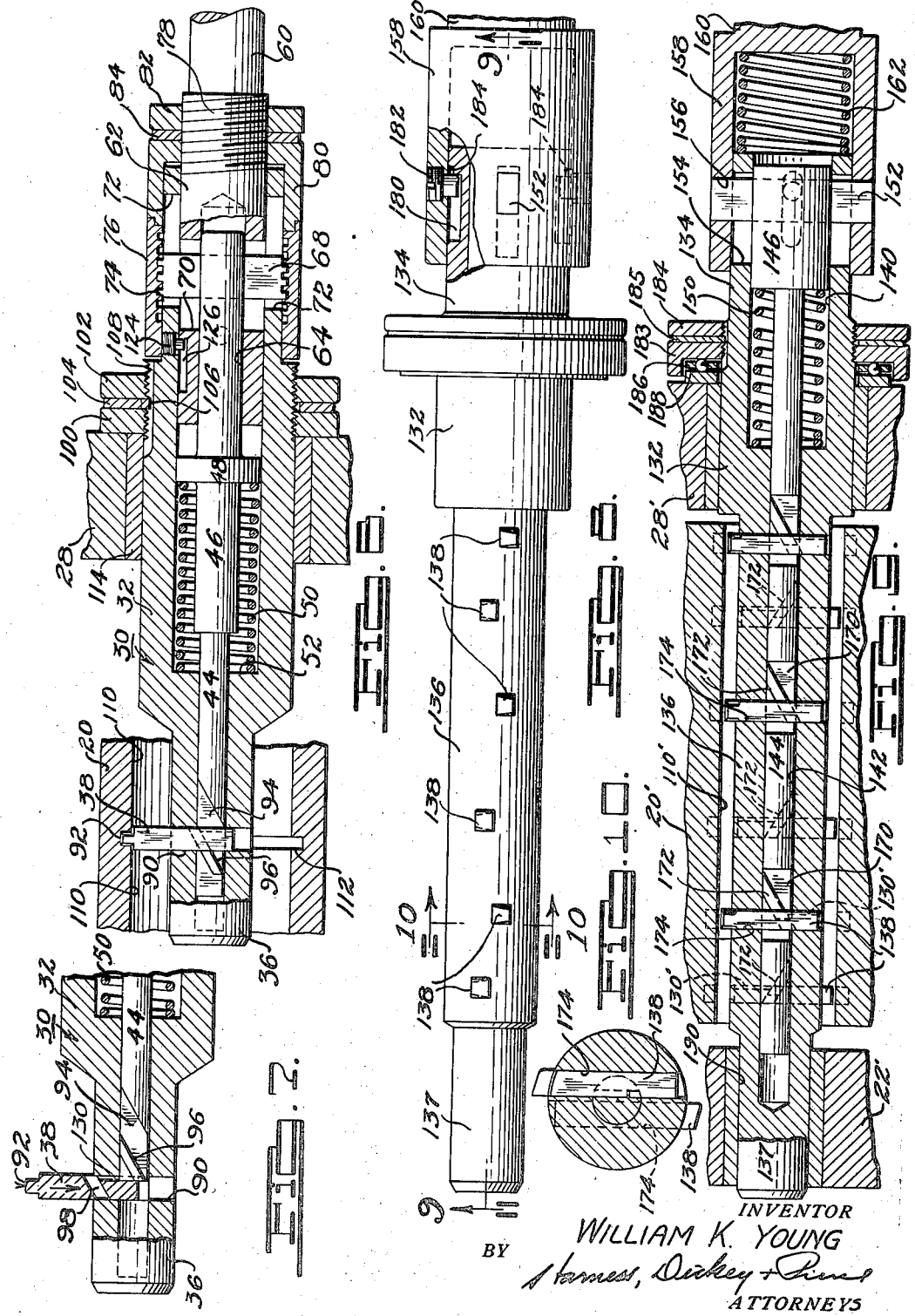

2,247,283

UNITED STATES PATENT OFFICE 2,247,283

BORING TOOL

William K. Young, Detroit, Mich., assignor to Eclipse Counterbore Company, Detroit, Mich., a corporation of Michigan Application March 22, 1939, Serial No. 263,469

8 Claims. (Cl. 77—58)

This invention relates to boring tools and particularly to such tools as are employed for undercutting or internally grooving a bore in a piece of work, the principal object being the provision of a device of this type that is operative automatically as a result of the relative axial feed between the work and the tool during a normal machining operation.

Objects of the invention include the provision of a boring tool having one or more cutter blades so constructed and arranged that during initial advancement thereof into a bore in a piece of work the cutter blade will remain in inoperative position, and when advanced a desired degree into the bore will automatically operate to project the cutter blade into cutting relation with respect to the walls of such bore; the provision of a construction as above described so constructed and arranged as to permit a maximum strength to be obtained in the main body portion of the tool, thereby enabling the overall diameter of the tool to be reduced; the provision of a construction as above described in which an axially reciprocable plunger is provided internally of the main body portion of the tool and so cooperates with the cutter blade as to control the amount of radial projection thereof in accordance with the axial position of the plunger in a new and novel manner; the provision of a boring tool including a main body portion having an opening extending transversely therethrough and the cutter blade slidably received in the opening, a plunger being reciprocably received in the main body portion and provided with a key disposed obliquely to the axis of the plunger and normally slidably received in a groove in the cutter blade to control the extent of radial projection thereof, the cutter blade being so constructed and arranged as to facilitate the engagement of the key in the groove during assembly of the cutter blade to the tool and to the plunger therein; the provision of a boring tool having a cutter blade and means for projecting the cutter blade from the tool during relative advancement of a tool supporting spindle with respect to a piece of work together with a novel means for accurately and visually determining the extent of projection of the cutter blade; the provision of a boring tool having certain other novel features of construction to be hereinafter more specifically described; and the provision of a boring tool that is simple in construction, economical to manufacture and efficient in use.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views—

Fig. 1 is a fragmentary perspective view of a boring machine or mill illustrating the application of the present invention thereto;

Fig. 2 is an enlarged side elevational view of the boring tool shown mounted in the machine in Fig. 1 and illustrating in fragmentary section certain portions of the machine and of the work in operative relation with respect thereto, the various parts of the tool being shown in contracted or normally inoperative position;

Fig. 3 is a partially broken sectional view taken in a plane approximately including the axis of the boring tool shown in Fig. 2, as on the line 3—3 thereof;

Fig. 4 is an enlarged sectional view taken on the line 4—4 of Fig. 2;

Fig. 5 is an enlarged sectional view taken on the line 5—5 of Fig. 2;

Fig. 6 is a view similar to Fig. 3 but illustrating the position which the various parts of the tool assumes when the cutter blade is fully expanded;

Fig. 7 is a fragmentary view taken axially through the outer end of the tool illustrating the preferred procedure followed in inserting a cutter blade into the tool and more clearly bringing out the construction of the cutter blade;

Fig. 8 is a partially broken side elevational view of a modified form of boring tool employing a plurality of cutter blades;

Fig. 9 is a sectional view taken in a plane parallel to the axis of the tool shown in Fig. 8, as on the line 9—9 thereof, and illustrating certain portions of a boring machine or mill, such as that of the type shown in Fig. 1 and the work in operative relation with respect thereto; and, Fig. 10 is an enlarged transverse sectional view taken on the line 10—10 of Fig. 8.

A boring tool constructed in accordance with the present invention is particularly valuable in connection with the machining of grooves, annular recesses or other enlargements in the bores of machine tool parts or other pieces of work. Its primary importance lies in its capability of being introduced into a bore and after the cutting blade thereof has reached a predetermined axial position in the bore, automatically expanding into machining relation with respect to the surface of the bore. The mechanism provided is such as to accurately control the amount of radial movement of the cutter blade upon expansion and preferably is further such as to permit the initial or inoperative position or location of the cutting edges of the blade to be manually adjusted with respect to the axis of the tool whereby the effective diameter of the blade when expanded may be accurately and positively controlled and adjusted in service.

Referring now to the accompanying drawings and particularly to Fig. 1 thereof, a conventional type of boring machine or boring mill is shown to which the present invention is applicable, it being understood in this respect, however, that the present invention is applicable to any conventional type of boring machine or boring mill, drill press, or the like and regardless of whether the work is fed towards the tool or the tool is fed towards the work, or whether the tool or the work is rotated. The particular boring machine illustrated in Fig. 1 includes a supporting base structure generally indicated at 11 provided with a driving head indicated generally at 12 thereon including a rotatable driving spindle 14. The base 11 is also provided with suitable slides upon which a suitable table 18 is slidably mounted for feeding or other movement in a direction parallel to the axis of the spindle 14. The particular table 18 shown is provided with suitable and conventional means for receiving, locating and securing a piece of work such as 20 in fixed relation thereto, it may provide an outboard bearing support for guide 22 for the boring bar where such is deemed desirable or necessary and the boring bar is formed for cooperation therewith, and suitable supports 26 fixed to the table and supporting a stop collar or member 28 in preferably fixed position thereon. It will be understood that the boring bar which is here generally indicated at 30 is received by the spindle 14 in axially aligned relation with respect thereto and cooperates therewith in a conventional manner for receiving driving movement therefrom.

Boring bars constructed in accordance with the present invention may be provided with more than one cutter blade projecting in the same or opposite directions from the tool, simply by providing the required number of apertures in the body portion of the tool required to receive such blades and by forming the blade actuating plunger for cooperation with such blade. For the purpose of simplicity in description and explanation, however, the tool shown by way of illustration in Figs. 1 to 7, inclusive, is equipped with a single cutter blade, the manner in which additional cutter blades may be provided thereby being made clear to those skilled in the art.

The boring bar itself as illustrated in Figs. 1 to 7, inclusive, comprises a cylindrical main body portion 32 having the inner or righthand end thereof as viewed in the drawings reduced to form a cylindrical extension 34 and having the outer or lefthand end as viewed in the drawings reduced as at 36, and formed to receive the cutter blade 38. In the particular construction shown the cutter blade 38 is located at a relatively short distance axially from the corresponding end of the enlarged portion of the main body portion 32 and consequently there is not sufficient overhang to the tool to require the employment of an outboard bearing, but where the cutter blade 38 is located further out on the portion 36 or at such distance as to require additional support, the end 36 may be extended so that when employed in a machine such as illustrated in Fig. 1 its extended end may be closely and rotatably received by the outboard bearing 22 to provide such support, as for instance, in the manner illustrated in the construction shown in Figs. 8, 9 and 10.

The main body portion 32 is provided with a cylindrical bore 40 therein located in axially concentric relation therewith and extending from the inner or righthand end as viewed in the drawings to a point therein short of the end 36 where it joins with a concentric but smaller bore 42 which extends into the end 36 to a point adjacent the outer or lefthand end thereof.

A plunger 44 is relatively closely but axially slidably received in the bore 42 and extends inwardly or to the right as viewed in the drawings into the bore 40 where it is provided with an enlarged cylindrical portion 46 which extends inwardly or to the right as viewed in the drawings to a point adjacent the inner or righthand end of the portion 34. Approximately midway its length the enlarged portion 46 is provided with a circular flange 48 thereon and preferably formed integrally therewith, the peripheral surfaces of which are relatively closely but slidably received by the walls of the bore 40. A coil spring 50 surrounding the inner end of the plunger 44 and the outer end of its enlargement 46 is maintained under compression between the shoulder 52, formed at the junction of the bores 40 and 42, and the outer face of the flange 48, thus constantly urging the plunger 44 to the right as viewed in the drawings.

A shank member having a terminal shank portion 60 adapted to be drivingly received by the outer end of the machine spindle 14 is provided with a cylindrical main body portion 62 which is relatively closely but axially slidably received in the inner or righthand end of the bore 40 of the main body portion of the tool. This shank member is provided with a bore 64 in which the major portion of the enlargement 46 of the plunger 44 inwardly or to the right of the flange 48 is relatively closely but slidably received. The inner or righthand end of the enlargement 46 of the plunger 44 is provided with a diametrical slot 66 therethrough in which a diametrically extending bar member 68 is relatively closely received, the bar member extending outwardly through an axially elongated diametrically disposed slot 70 formed in the portion 62 of the shank and through an axially elongated diametrically disposed slot 72 in the end portion 34 of the main body of the tool. The radially outer end of the bar member 68 is provided with threads 74 thereon which operatively engage the threaded interior of a sleeve-like nut 76 rotatably and axially slidably received and mounted upon the reduced end portion 34 of the main body portion of the tool.

The inner or righthand end of the portion 62 of the tool shank is threaded as at 78 and threadably received thereon is an adjustable sleeve member 80 the outer or lefthand end of which as viewed in the drawings is preferably of the same diameter as and is adapted to engage the inner or righthand end of the sleeve or nut 76 and, acting through the bar member 68, serves to limit movement of the plunger 44 inwardly or to the right as viewed in the drawings under the influence of the spring 50. As will be appreciated by rotating the sleeve 80 it may be caused to advance or retract along the axis of the tool shank to limit the rearwardmost position of the nut 76 as adjustably determined thereby. For the purpose of locking the sleeve 80 in adjusted position on the tool shank a cooperating lock nut 82 is provided, a washer 84 preferably being interposed between it and the sleeve 80 as indicated.

Because of the threaded inter-engagement of the radially outer ends of the bar member 68 with the inner surface of the nut 76 it will be appreciated that by rotating the nut 76 the axial relation of the plunger 44 and enlargement 48 with respect to the nut 76 may be varied. This is employed for determining the extent of radial feed of the cutter blade 38 as will hereinafter be more fully described.

The cutter blade 38 shown is of rectangular cross-sectional configuration and while it may be arranged with its center line disposed at an angle to a plane perpendicular to the axis of the tool as long as it is also arranged at an angle with respect to such axis, it is shown for the purpose of simplicity in its preferred relation, namely disposed approximately radially with respect to the axis of the tool. The end 36 of the main body portion of the tool is provided with a transverse opening 90 therethrough for reception of the blade 38, the size and cross-sectional configuration of the opening 90 being such as to permit it to relatively closely but longitudinally slidably receive the blade 38 therein. The outer end of the blade may, of course, be ground or otherwise formed to provide a cutting edge 92 of any desired size, shape, or contour. As best indicated in Fig. 4 it will be observed that one face of the opening 90 lies in a plane parallel to the axis of the tool and in a plane preferably approximately including such axis so as to impart the proper rake to the cutting edge of the tool.

That area of the plunger 44 adjacent the point of intersection of the cutter blade 38 with the bore 42 is machined to form a flat diametrical surface 94 provided approximately centrally thereof with an upstanding integral key 96 disposed at an oblique angle with respect to the axis of the plunger 44. As best illustrated in Fig. 7 the cutter blade 38 is provided with an oblique keyway or groove 98 therein for closely but slidably receiving the key 96 therein. It will thus be realized that with this construction, when the key 96 is engaged in the keyway 98 axial movement of the plunger 44 will effect radial projection or retraction of the cutter blade 38 depending upon the direction of movement of the plunger 44. It may be noted at this point that with the construction described the reduced end portion 36 of the main tool body is weakened to only a small degree by the provision of the opening 90 therethrough, this being an advantage over previously suggested constructions which necessitate slotting of the end of the tool, and consequent weakening of the same, to a materially greater degree. Also by providing a cylindrical plunger such as the plunger 44 and forming the flat 94 and key 96 thereon in the manner indicated, permits a tool constructed for practical boring of much smaller bores than possible with prior art structures of a similar type.

Thus with the construction described it will be appreciated that if the main body portion 32 is held against axial movement and axial movement is imparted to the shank member for outward movement, or movement to the left as viewed in the drawings, from the position shown in Fig. 3 to the position shown in Fig. 6, the shank member in moving outwardly will act through the collar 80 to move the nut 76 and consequently the bar member 68 and plunger 44 a corresponding distance in such direction against the force of the spring 50, and the plunger 44 in thus moving outwardly will cause the cutter blade 38 to move from the position illustrated in Fig. 3 to the position illustrated in Fig. 6, in which it will have been projected into cutting engagement with respect to a suitably mounted piece of work.

In actual practice it will be appreciated that means must be provided in conjunction with the tool described so that as the spindle of the machine carrying the tool is fed towards the work and after the end of the tool carrying the cutter blade 38 has entered the bore of the work to the desired distance, the axial travel of the main body portion 32 will be stopped so that upon continued feeding movement of the spindle and consequently the shank 60 of the tool relative to the work, the cutter blade 38 will be expanded into cutting relation with respect to the walls of the bore in the work piece. Such means may take the form of a shoulder or stop member associated with the main body portion 32 and obviously may be located at any convenient point in the length thereof. Preferably such stop means should be adjustable axially of the main body portion 32 so as to enable ready adjustment of the position of the cutter blade 38 in the bore of the work at which the cutter blade will function. In the present case this is accomplished by threading the rear end of the main body portion 32 and mounting a cooperating nut 100 thereon, the axial position of the nut 100 on the main body portion 32 being varied simply by rotating it on the main body portion. In order to lock the nut 100 in axially adjusted position on the main body portion 32 a cooperating lock nut 102 is provided preferably with the inter-position of a washer 104 between them. The washer 104 is preferably provided with an inwardly projecting tongue 106, best shown in Fig. 3, adapted to be received in a keyway 108 extending in axially parallel relation with respect to the main body portion 32 and extending through the threaded portion thereof as illustrated.

In the illustrative set up illustrated in Figs. 1, 2, 3 and 6 the work piece 20 is provided with a bore 110 in which it is assumed it is desired to form an annular groove by means of the cutter blade 38. The tool 30 is adapted to project through the stop collar or member 28 fixed with respect to the work 20 and against which the stop nut 100 is adapted to contact in order to determine the particular location longitudinally of the bore 110 at which the cutter blade 38 will be expanded to machine a groove such as 112 therein. In the particular case shown the stop collar 28 is provided with a bushing 114 for receiving and guiding the main body portion 32 of the tool during the operation and this is desirable in some instances but not necessary in all.

Assuming now that the work piece 20 has been mounted upon the table 18 and secured in position thereon, the tool 30 has been projected through the bushing 114 in the stop collar 28, the spindle 14 is rotated to rotate the tool 32 and the table is caused to feed towards the head 12, as the feeding movement of the table 18 carrying the work 20 and stop collar 28 is continued towards the head 12 the outer end of the tool carrying the cutter blade 38 will enter the bore 110 in the work 20. When the cutter blade 38 reaches the desired position within the bore 110 axially thereof the stop nut 100 will contact the inner axial face of the stop collar 28 which will thereafter, during continuing of the feeding movement of the table 18, cause the main body portion 32 and consequently the cutter blade 38 to move towards the head 12 of the machine at the same rate as the feeding movement of the table 18, and during this phase of movement the cutter blade 38 will, therefore, remain stationary axially of the bore 110 with respect to the work 20 but, of course, will be rotating with the spindle 14. As soon as the nut 100 contacts the stop collar 28 continued feeding movement of the table 18 towards the head 12 will cause the shank of the tool including the portions 60 and 62 to continue its relative feeding movement with respect to the work 20 and, acting through the sleeve 80, nut 76 and bar member 68, cause a similar feeding movement of the plunger 44. This feeding movement of the plunger 44, as previously described, will cause the cutter blade 38 to be projected radially of the tool and into cutting relation with respect to the walls of the bore 110.

The amount which the cutter blade 38 will thus be projected radially from its normal or inoperative position may be controlled by the distance which the table 18 is fed towards the head 12 after engagement of the stop nut 100 with the stop collar 28, this being accomplished by any of the conventional means employed for controlling the amount of feeding movement between a pair of relatively movable machine tool parts and which, in the illustration shown in Fig. 1, may comprise adjustable stop members such as the members 116 movable with the table 18 and engageable with a plunger 118 carried by the base 11 of the machine. On the other hand, and particularly where the tool is expanded to its fullest extent during each operation, the maximum diameter of the groove which will be machined by the tool may be varied by axial adjustment of the sleeve or stop collar 80 along the shank portion 62, but this, once set for a given diameter of cut, will ordinarily remain fixed, and adjustment of the tool for wear of the cutter blade taken care of by the nut 76. Where a change in diameter of cut outside the range of a particular blade 38 is desired, a new blade of the required length will be employed to replace the one then in the tool.

The distance which the cutting edge 82 of the blade 38 will project radially from the axis of the tool when expanded, and consequently the depth of the groove 112, is also adjustably controlled for a predetermined extent of feeding movement of the machine after the nut 100 engages the stop collar 28, by manual adjustment of the nut 76. In other words it will be appreciated that by rotating the nut 76 the initial or inoperative position of the cutter blade 38 radially of the tool may be quickly and easily varied. Accordingly, for a given feed of the machine after the nut 100 has contacted the stop collar 28 should it be desired to increase the depth of the groove 112 being machined by the cutter blade 38, the nut 76 will be rotated to advance the plunger 44 and to project the cutter blade 38 a greater amount in an initial or inoperative position so that thereafter, during relative movement between the plunger 44 and main body portion of the tool, the cutter blade 38 will be projected radially outwardly to the desired extent required for machining a groove 112 of the proper depth. The use of the nut 76 for adjustment purposes as above described will ordinarily be limited to adjustment of the cutter blades after sharpening to compensate for the shortening in the length thereof, and to obtain an accurate final positioning of the radial position of the blade, the rough or initial adjustment being made through the rear stop sleeve or collar 80 as previously described.

In order to facilitate determination of the amount which the cutter blade 38 is projected or retracted by the nut 76 from a given initial or inoperative position, the circumference of the nut 76 adjacent the inner or righthand marginal edge thereof is preferably provided with a series of graduations, indicated generally at 120 in Fig. 2, and the adjacent surface of the sleeve 80 is provided with an indicator mark 122 for cooperation therewith. The pitch of the threads of the nut 76 is preferably so correlated with the angularity of the key 96 engaging the blades 38 that upon one complete rotation of the nut 76 the blade 38 will be projected or retracted a decimal part of an inch, as for instance fifty-thousandths of an inch, in which case the graduations 120 may be provided with fifty equally spaced parts enabling adjustment of the blade 38 to be made and visually determined in one-thousandths of an inch.

It will be understood that when the feeding movement of the work 20 towards the head 12 has progressed to the full extent provided for by the setting of the machine and the groove 112 has been machined by the cutting blade 38 to the required depth, a reversal of the feeding movement of the machine will, because of the compression of the spring 50 acting between the plunger 44 of the main body portion 32, first permit withdrawal of the plunger 44 and consequent retraction of the cutter blade 38 until the cutter blade 38 has reached its fully retracted or inoperative position before the main body portion 32 will then be withdrawn with the plunger 44 and carry the stop nut 100 inwardly or to the right away from contact with the stop collar 28. The amount of relative movement of the plunger 44 inwardly or to the right as viewed in the drawings with respect to the main body portion 32 before both these parts will move inwardly in unison may be determined in several different ways. For instance the bar 68 contacting the inner end of the slot 72 may serve to limit the movement of the parts in this direction. On the other hand a dogging screw such as the screw 124 inserted through the reduced end 34 of the main body portion 32 and having its dog end projecting into an elongated slot 126 formed in the surface of the shank portion 62 may be employed for this purpose. This last construction is preferred for the reason that in disassembling the tool, after the sleeve 80 and nut 76 have been removed and the bar 68 withdrawn from the various cooperating slots, the screw 124 will prevent the force of the spring 50 from inadvertently projecting the shank portion and the plunger of the tool.

Another feature of the present invention which it is desired to call attention to is in connection with the formation of the cutter blade 38 shown in order to facilitate engagement thereof with the key 96 when the blade 38 is being re-inserted in the tool after sharpening, replacement or the like. In this respect it will be appreciated that because of the close fit between the key 96 and groove 98, if that portion of the blade 38 received within the opening 90 was of uniform cross-sectional configuration throughout it would require extremely accurate positioning of the blade 38 axially of the opening 90 in order to insure alignment of the groove 98 in the blade 38 with the key 96 before the key 96 would be capable of entering the groove 98. It has been found that where no special provision has been made to align the key 96 and groove 98 under such circumstances a workman may expend a considerable amount of time attempting to effect such alignment, and by the use of this feature of the present invention this waste of time is entirely eliminated. According to this feature of the present invention, and as best shown in Fig. 7, the inner or righthand face of the blade 38, as viewed in the drawings, from the slot 98 to that end of the blade opposite the cutting edge 92 and at least for a width corresponding with the depth of the keyway 98 is cut away as indicated at 139. The blade 38 may be relieved as at 130 over the full width of the blade face if desired. It will be appreciated that with this construction when it is desired to insert a blade 38 in the opening 90 that if the nut 76 is adjusted so that the extreme outer end of the key 96 projects a slight distance less than the depth of the cut away portion 139, into the opening 90, and which may be readily determined visually by looking through the hole 90, and then the blade 38 is inserted with the cut away end portion first, the blade 38 will pass into the opening 90 with the end of the key 96 received by the cut away portion 139 until the end of the key 96 strikes the radially outer wall of the keyway 98 at the end of the cut away portion which thus stops the cutter blade 38 from moving further inwardly and in a position in which the key 96 is in alignment with the keyway 98. When this occurs if the nut 76 is operated to move the plunger 44 outwardly, the key 96 will then properly enter the keyway 98 and the plunger and cutter blade will thereupon become properly operatively engaged with each other. It will then also be appreciated that this feature of the invention always insures that the key will be entered into the slot a sufficient distance to prevent the possibility of shearing away of the end of the key, or the end wall portion of the keyway, because of insufficient engagement of these parts under the radially inward pressure applied to the cutter blade during operation.

In Figs. 8, 9 and 10 a modified form of construction is shown in which a plurality of cutter blades are employed in the same tool for simultaneously machining a plurality of grooves in the wall of a bore in a piece of work. In the construction shown in Figs. 8, 9 and 10, the tool is provided with a main body having an enlarged portion 132, corresponding to the portion 32 in the first described construction but of relatively shorter length, a reduced inner or righthand end portion as viewed in the drawings, indicated at 134 and corresponding with the portion 34 in the first described construction, and a cylindrical opposite end portion 136, corresponding with the end portion 36 in the previously described construction but of relatively greater length and in this case terminating at its extreme end in a pilot portion 137 which, when employed in a machine such as illustrated in Fig. 1, for instance, is adapted to be received and guided during operation in the pilot member 22 previously described. The portion 136 carries a plurality, in this case shown as six, generally radially directed cutter blades 138, corresponding with the cutter blade 38 previously described.

The body portion 132 in the construction illustrated in Figs. 8, 9 and 10 is provided with a concentric cylindrical bore 140, corresponding with the bore 40 in the previously described construction, and into which opens the cylindrical concentric bore 142 of smaller diameter which extends for the full length of the portion 136 and into the pilot portion 137, this bore 142 corresponding to the bore 42 in the previously described construction. A plunger 144, corresponding with a plunger 44 in the previously described construction, is received in the bore 142 but in this case its inner or righthand end as viewed in the drawings is enlarged as at 146 to a diameter which is relatively closely but slidably received in the bore 140, the end 146 in this case being relatively short as compared to the previously described construction. A coil spring 150 is provided in the bore 140 surrounding that portion of the plunger 144 exposed therein and acting against the outer axial face of the enlarged end 146 constantly urges the plunger 144 inwardly or to the right as indicated in the drawings.

The inner or righthand end of the enlarged portion 146 of the plunger 144 is provided with a diametrical slot to which a bar member 152, corresponding with the bar member 68 of the previously described construction, projects, it passing through an axially elongated slot 154, corresponding with the slot 72 in the previously described construction, formed in the portion 134 of the body of the tool, and beyond the bar member 152 projects through and is closely received in a diametrical slot 156 formed in the sleeve-like end 158 formed integrally with a shank 160. The end portion 134 is relatively closely but slidably received in the sleeve portion 158 of the shank. Thus in this construction in a manner similar to that in the previous views, the shank end of the tool is connected through a bar member, 68 in the previous views and 152 in the construction shown in Figs. 8 to 10, inclusive, with the plunger for equal movement axially of the tool, but in this case no adjustable means such as the nut 76 previously described is provided for adjustably varying the relation between the plunger and the shank although such nut may obviously be provided if desired. In the case of the tool shown in Figs. 8 to 10, inclusive, because of the greater number of cutter blades employed, it is preferable to have available a greater spring pressure normally urging the plunger inwardly than in the previously described construction and this is accomplished in this case by providing an additional spring 162 housed within the sleeve-like end 158 of the shank 160 and maintained under compression between the end wall of the portion 158 and the opposed axial face of the body portion 134.

The various blades 138 are operatively connected to the plunger 144 in substantially the same manner as in the previously described construction. In other words a flat 170 is machined on the plunger 144 adjacent the position of each of the blades 138 when the parts are in their normal position and a key 172, corresponding with the key 96 in the previously described construction and extending in a corresponding oblique direction with respect to the axis of the plunger 144, is preferably formed integrally with the plunger 44 and projects upwardly from each of the flats 170. In this case, however, the flats 170 and keys 172 are preferably formed on alternately opposite sides of the plunger 144 as shown and the cutter blades 138 project alternately in opposite directions from the body portion 136. Also as illustrated in Fig. 10 the openings 174 in the body portion 176 for reception of the cutter blades 138 are so arranged that the advanced faces of the cutter blades in the direction of rotation fall short, by a short distance, of being exactly in a diametrical plane passing through the axis of the tool. This is particularly advisable where the cutter blades 138 are grouped in relatively close relation with respect to each other axially of the tool and in which case the flats 170 approach axially overlapping relation on the plunger 144, and also serves to impart added strength to the plunger 144 in an axial direction in view of the added stresses to which it is subjected longitudinally thereof by reason of it being required to actuate a plurality of cutter blades. However, it will be readily appreciated where the blades 138 are spaced from each other axially of the tool a distance sufficient to eliminate possibility of overlapping of the flats 170 on opposite sides of the plunger 144, the advanced faces of the cutter blades 138 may be positioned in an exact diametrical plane if desired. It will also be appreciated that while the flats and keys 172 may all be formed on the same side of the plunger 144, it is preferable to alternate them on opposite sides as shown in order that the cutting forces exerted by the various blades 138 will be more evenly distributed with respect to the axis of the tool and, therefore, have a less tendency to cause the tool to spring during operation.

In order to prevent rearward movement of the plunger 144 under the influence of the springs 159 and 162 during normal operation to an extent sufficient to withdraw the various keys 172 from the blades 138, the following mechanism is provided as best shown in Fig. 8. The main body portion 134 is exteriorly provided on its outer face at diametrically opposite points with axially elongated grooves or recesses 180. A dog end screw 182 is projected through the shank sleeve 158 in line with each of the grooves 180 and with the dog end thereof received within such grooves, the inner ends of these screws abutting against the inner or righthand end of the grooves 180 in order to limit the inward movement of the plunger 144 under the influence of the springs 159 and 162 to an extent less than that required to withdraw the keys 172 from the blades 138. The length of the grooves 180 are such as to permit a sufficient axial movement of the plunger 144 relative to the main body of the tool for normal operation, the dog ends of the screws 182 simply moving forwardly in the grooves 180 during the expanding movement of the tool.

It will be appreciated that with a plurality of cutter blades such as the cutter blades 138 employed in the construction illustrated in Figs. 8 to 10, inclusive, unless some special means was provided for aligning the keyways in the various blades 138 with the corresponding keys 172 during assembly of the cutter blades to the tool, it would be an extremely difficult and laborious operation to simultaneously align all of the keyways in the cutter blades with the corresponding keys 172. Accordingly, the feature of undercutting each blade as illustrated at 130 in Fig. 7 and indicated at 130' in Figs. 8, 9 and 10, in order to effect such alignment, is extremely important in connection with a multi-blade tool as will be readily appreciated and the blades 138 are formed identical to the blades 38 as far as this feature of construction is concerned.

The construction shown in Figs. 8 to 10, inclusive, is further formed to facilitate this blade inserting operation and this feature is in connection with locating the plunger 144 at the proper axial position during insertion of the blades 138 in the tool so that the outer ends of the keys 172 will be properly positioned with respect to the corresponding blade receiving openings in the manner described in connection with the construction shown in the previous figures. In other words, means are provided for so locating the plunger 144 as to permit insertion of the blades with the cut away portions 130' clearing the projecting ends of the corresponding keys 172 until the ends of the respective keys 172 are brought into contact with the remote wall of the keyway for the keys 172 in the corresponding cutter blade 138, to obtain the desired alignment of the cutter blades and keys. This feature is accomplished in the manner illustrated in Fig. 8 in which it will be noted that the inner end of each of the grooves 180 is stepped to form a shallow recess 184 forming a continuation of the radially outer portion of each groove 180. The axial dimension of each recess 184 inwardly beyond the corresponding end of the corresponding groove 180 is such that upon partial withdrawal of the screws 182, as by screwing them outwardly in the shank sleeve 158, a further and additional inward movement of the plunger 144 and shank sleeve 158 relative to the main body of the tool is permitted by projection of the inner ends of the screws 182 into the recesses 184, upon which the plunger 144 will be so located that the outer ends of the keys 172 will project into the corresponding openings 174 for the various cutter blades 138 a distance slightly less than the depth of the undercut 130' provided in the blades 138. Thus when the screws 182 are withdrawn radially a sufficient distance to permit them to be projected by the springs 159 and 162 into the recesses 184, the cutter blades 138 may all be removed, sharpened or replaced and then re-inserted into their respective openings 174 and all simultaneously aligned with the respective keys 172, this facilitating both original assembly and servicing of the tool as will be readily appreciated.

A stop nut 183, corresponding to the stop nut 100 in the previously described construction is threaded on the rear end of the main body portion 132 in the same manner and for the same purpose as the stop nut 100 and is adapted to be locked in axially adjustable position by means of a lock nut 184 and washer 185 cooperating therewith in identically the same manner as the corresponding parts in the previously described construction. In this case, however, the forward or outer face of the nut 183 is recessed as at 186 and a ball thrust bearing assembly 188 is provided in such recess for actual contact with the stop ring on the machine in which the tool is being employed. A corresponding thrust bearing may be employed with the stop nut 100, if desired, as will be readily appreciated.

In Fig. 9 a stop ring 28' corresponding with the stop ring 28 previously described is illustrated in cooperative relation with respect to the tool and the stop nut 186, it functioning in identically the same manner as the stop ring 28 previously described. This view also illustrates a piece of work 20' having a bore 110' in which that portion of the tool carrying the blades 133 is received and in which the blades are operated in substantially the same manner as in the construction described in connection with the previous figures. This view also illustrates the pilot portion 137 on the outer end of the tool as being received in a bore 199 formed in the outboard bearing 22', corresponding to the outboard bearing 22 illustrated in Fig. 1, which construction is advisable in this construction in view of the length of the tool and in order to prevent possible springing of the tool during a machining operation.

It will be appreciated that the tool shown in Figs. 8, 9 and 10 operates in substantially the same manner as the tool illustrated and described in connection with the previous figures except that in this case no manual adjustment of the initial position of the cutter blades 133, such as is accomplished by rotation of the nut 76 in the construction shown in the previous figures, is possible, the extent of radial projection of the blades 133 and consequently the depth of the groove formed in this case being controlled solely by the extent of relative feeding movement between the tool spindle of and the work in the machine in which the boring tool is mounted in a conventional or other manner.

Formal changes may be made in the specific embodiments of the invention described without departing from the spirit or substance of the broad invention, the scope of which is commensurate with the appended claims.

What I claim is:

1. In a boring tool, in combination, a main body portion having a bore therein and provided with an opening extending transversely therethrough, a plunger axially slidably received in said bore, a cutter blade slidably received in said opening for movement longitudinally thereof, said plunger and blade cooperatively engaging each other for simultaneous movement in the direction of their respective lengths, a shank member axially movably associated with respect to said main body in supporting relation with respect thereto, a nut member rotatably and axially slidably mounted with respect to said main body, a stop member carried by said shank in normally fixed relation with respect thereto and serving to limit movement of said nut member axially in one direction, and means interconnecting said nut and plunger for equal movement axially of said main body so constructed and arranged as to vary the position of said plunger axially of said nut upon rotation of said nut whereby to enable the axial relation of said nut and plunger to be varied.

2. A boring tool comprising, in combination, a main body having a bore therein and an opening therethrough extending transversely with respect to the axis of said main body, a plunger axially slidably received in the bore of said main body, a cutter blade longitudinally slidably received in said opening, said cutter blade and said plunger being cooperatively associated with each other for simultaneous movement in the direction of their respective lengths, a shank member having an end portion axially slidably received within the bore of said main body in supporting relation with respect thereto and in turn axially slidably receiving an end of said plunger therein, and means extending radially through said main body and movable axially with respect thereto operative to effect equal axial movement of said shank member and said plunger in the same direction.

3. A boring tool comprising, in combination, a main body having a bore therein and an opening therethrough extending transversely with respect to the axis of said main body, a plunger axially slidably received in the bore of said main body, a cutter blade longitudinally slidably received in said opening, said cutter blade and said plunger being cooperatively associated with each other for simultaneous movement in the direction of their respective lengths, a shank member having an end portion axially slidably received within the bore of said main body in supporting relation with respect thereto and in turn axially slidably receiving an end of said plunger therein, a stop member carried by said shank member and embracing an end of said main body for axially slidable movement with respect thereto, and means interconnecting said stop member and said plunger including a member extending diametrically with respect to said main body for effecting equal axial movement of said shank member and plunger relative to said main body in at least one direction.

4. A boring tool comprising, in combination, a main body having a bore therein and an opening therethrough extending transversely with respect to the axis of said main body, a plunger axially slidably received in the bore of said main body, a cutter blade longitudinally slidably received in said opening, said cutter blade and said plunger being cooperatively associated with each other for simultaneous movement in the direction of their respective lengths, a shank member having an end portion axially slidably received within the bore of said main body and in turn axially slidably receiving an end of said plunger therein, a stop member carried by said shank member and embracing an end of said main body for axially slidable movement with respect thereto, and means interconnecting said stop member and said plunger including a member extending diametrically with respect to said main body for effecting equal axial movement of said shank member and plunger relative to said main body in at least one direction, said stop member being adjustable axially of said shank member whereby to permit adjustment of the longitudinal relation of said plunger and shank member.

5. A boring tool comprising, in combination, a main body having a bore therein and an opening therethrough extending transversely with respect to the axis of said main body, a plunger axially slidably received in the bore of said main body, a cutter blade longitudinally slidably received in said opening, said cutter blade and said plunger being cooperatively associated with each other for simultaneous movement in the direction of their respective lengths, a shank member having an end portion axially slidably received within the bore of said main body and in turn axially slidably receiving an end of said plunger therein, a stop member carried by said shank member and embracing an end of said main body for axially slidable movement with respect thereto, a nut rotatably and axially slidably mounted with respect to said main body and engageable with said stop member to limit axial movement thereof with respect to said shank member in at least one direction, and means interconnecting said nut and plunger for causing equal axial movement of said shank member and plunger in at least one direction with respect to said main body portion including a member adjustable axially of said nut interconnecting said plunger and nut and extending radially through and being movable in a direction axially of said main body.

6. A boring tool comprising, in combination, a main body having a bore therein and an opening therethrough extending transversely with respect to the axis of said main body, a plunger axially slidably received in the bore of said main body, a cutter blade longitudinally slidably received in said opening, said cutter blade and said plunger being cooperatively associated with each other for simultaneous movement in the direction of their respective lengths, a shank member having an end portion axially slidably received within the bore of said main body and in turn axially slidably receiving an end of said plunger therein, a stop member carried by said shank member and embracing an end of said main body for axially slidable movement with respect thereto, a nut rotatably and axially slidably mounted with respect to said main body and engageable with said stop member to limit axial movement thereof with respect to said shank member in at least one direction, and means interconnecting said nut and plunger for causing equal axial movement of said shank member and plunger in at least one direction with respect to said main body portion including a member adjustable axially of said nut interconnecting said plunger and nut and extending radially through and being movable in a direction axially of said main body, said member and nut being so constructed and arranged as to effect an axial shifting of said member with respect to said nut upon rotation of said nut with respect to said main body.

7. In a boring tool, in combination, a main body provided with a bore, a plunger axially slidably received in said bore, said main body having an opening extending transversely therethrough and intersecting said bore, a cutter blade longitudinally slidably received in said opening, said cutter blade and said plunger being so constructed and cooperatively arranged with respect to each other as to effect displacement of said cutter blade longitudinally thereof upon axial movement of said plunger in said bore, spring means constantly urging said plunger toward a position to retract said cutter blade, a shank member axially slidably mounted with respect to said main body, a stop member axially adjustably mounted on said shank member, a nut rotatably and axially slidably mounted with respect to said main body and engageable with said stop member to limit axial movement thereof with respect to said shank member in at least one direction, and means associated with said nut and adjustable axially thereof upon rotation of said nut with respect thereto and movable axially of said main body interconnecting said nut and plunger for equal axial movement with respect to said main body.

8. In a boring tool, in combination, a main body having a bore therein and an opening extending transversely therethrough and intersecting said bore, a plunger axially slidably received in said bore, a cutter blade longitudinally slidably received in said opening, a key and keyway connection interconnecting said plunger and cutter blade for simultaneous movement in the direction of their respective lengths, a shank member axially slidably received in the bore of said main body and axially slidably receiving an end of said plunger therein, said plunger, shank member and main body being provided with registering diametrically disposed slots therethrough, a bar member relatively closely received in the slot in said plunger and slidably received axially of said main body and said shank member in said slots provided therein, a nut member rotatably and axially slidably mounted upon said main body and having threaded connection with the opposite ends of said bar member whereby to secure said nut and bar member together for equal movement axially of said main body portion when said nut is not rotating with respect to said main body portion and permitting displacement of said bar member axially of said nut member upon relative rotation between them, spring means constantly urging said plunger towards a position to place said cutter blade in one extremity of its movable position, and a stop member carried by said shank member and engageable with said nut whereby to effect movement of said plunger in opposition to the force of said spring upon relative movement of said shank member axially with respect to said main body.

WILLIAM K. YOUNG.